(12) United States Patent
Smilansky

(10) Patent No.: US 8,457,384 B2
(45) Date of Patent: Jun. 4, 2013

(54) UNIVERSAL COUNTING AND MEASUREMENT SYSTEM

(76) Inventor: Zeev Smilansky, Meishar (IL)

(*) Notice: Subject to any disclaimer, the term of this patent is extended or adjusted under 35 U.S.C. 154(b) by 820 days.

(21) Appl. No.: 12/591,988

(22) Filed: Dec. 7, 2009

(65) Prior Publication Data
US 2010/0158386 A1 Jun. 24, 2010

(51) Int. Cl.
G06K 9/46 (2006.01)

(52) U.S. Cl.
USPC .......................................... 382/141; 382/192

(58) Field of Classification Search
None
See application file for complete search history.

(56) References Cited

U.S. PATENT DOCUMENTS

| | | | |
|---|---|---|---|
| 6,098,029 A | 8/2000 | Takagi et al. | |
| 6,173,607 B1 | 1/2001 | Shahaf et al. | |
| 6,307,951 B1 | 10/2001 | Tanigawa et al. | |
| 6,434,271 B1 * | 8/2002 | Christian et al. | 382/194 |
| 6,483,935 B1 | 11/2002 | Rostami et al. | |
| 6,516,661 B1 | 2/2003 | Spillman et al. | |
| 6,645,066 B2 | 11/2003 | Gutta et al. | |
| 6,697,104 B1 | 2/2004 | Yakobi et al. | |
| 6,738,723 B2 | 5/2004 | Hamilton | |
| 6,931,149 B2 | 8/2005 | Hagene et al. | |
| 2002/0009218 A1 * | 1/2002 | Chapman et al. | 382/141 |
| 2008/0107304 A1 * | 5/2008 | Coulter et al. | 382/103 |
| 2010/0017407 A1 * | 1/2010 | Beniyama et al. | 707/6 |
| 2010/0046827 A1 * | 2/2010 | Anderson et al. | 382/141 |

* cited by examiner

Primary Examiner — Brian P Werner

(57) ABSTRACT

A universal counting and measurement system and method. The system and method are not restricted to a specific application, aimed at counting a specific type of object, but are capable of counting objects of a large variety of sizes and shapes. According to certain embodiments, the system and method are also capable of measuring volumes of materials held within a container or piled on a surface. The shape of the containers or the shape of the pile of material are not limited to a certain prescribed architecture. According to certain embodiments, the system is easily adapted to the different applications and can be made ready to work in a short time. The system is also capable of counting accumulating objects or measuring accumulating volumes within one or more containers or piles.

28 Claims, 11 Drawing Sheets

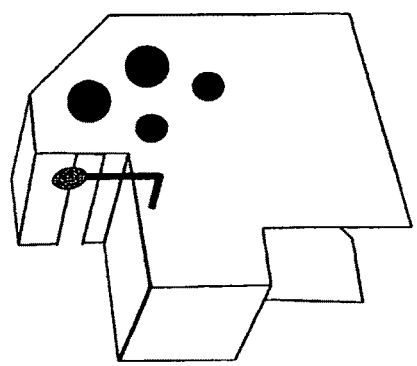 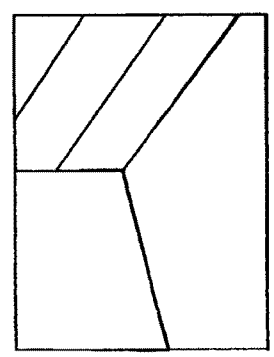
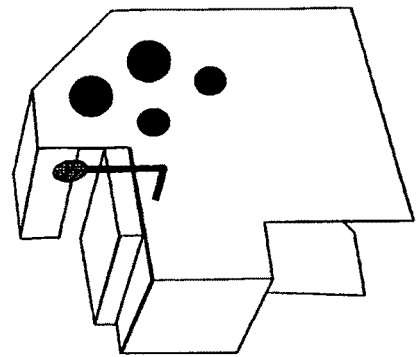 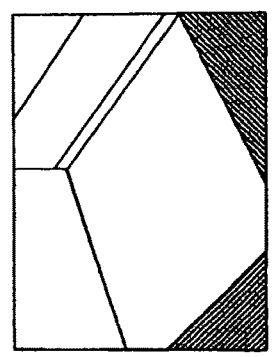
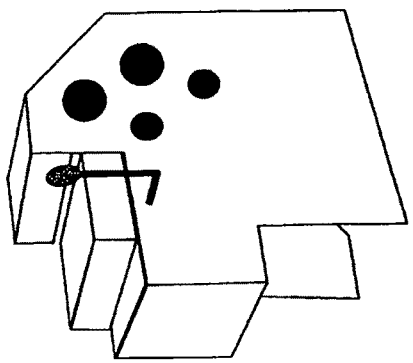 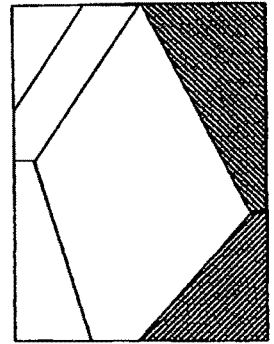
FIG. 9     PRINTER PAGE COUNTING EXAMPLE

| Pixels | Items |
|--------|-------|
| 305192 | 28 |
| 305193 | 28 |
| 305194 | 28 |
| 305195 | 28 |
| 305196 | 28 |
| 305197 | 28 |
| 305198 | 28 |
| 305199 | 28 |
| 305200 | 29 |
| 305201 | 29 |
| 305202 | 29 |
| 305203 | 29 |
| 305204 | 29 |
| 305205 | 29 |
| 305206 | 29 |
| 305207 | 29 |
| 305208 | 29 |
| 305209 | 29 |
| 305210 | 29 |
| 305211 | 29 |

Fig. 11

UNIVERSAL COUNTING AND MEASUREMENT SYSTEM

CROSS-REFERENCE TO RELATED PATENT APPLICATIONS

This patent application is a national stage application of International Application PCT/IL2008/000898, filed on Jul. 1, 2008, which claims priority to U.S. Provisional Patent Application No. 60/935,260, filed on Aug. 2, 2007. The entire contents of both applications are hereby expressly incorporated by reference.

FIELD OF THE INVENTION

The invention relates to a system and method for counting and measuring objects or volumes.

BACKGROUND OF THE INVENTION

Systems based on cameras and image processors, for counting objects and measuring volumes, are well known. Such systems are limited to counting or measuring specifically predefined objects or volumes in restricted working environments.

Related art references considered to be relevant as a background to the invention are listed below and their contents are incorporated herein by reference. Acknowledgement of the references herein is not to be inferred as meaning that these are in any way relevant to the patentability of the invention disclosed herein. Each reference is identified by a number enclosed in square brackets and accordingly the prior art will be referred to throughout the specification by numbers enclosed in square brackets.

[1] U.S. Pat. No. 6,697,104 "Video Based System And Method For Detecting And Counting Persons Traversing An Area Being Monitored".
[2] WO9110972 "Apparatus For Counting Sheets Lying On Each Other In A Stack"
[3] U.S. Pat. No. 6,738,723 "Pharmacy Pill Counting Vision System".
[4] U.S. Pat. No. 6,137,855 "Corrugated Sheet Counter".
[5] EP0743616 "Apparatus And Method For Counting Sheets".
[6] U.S. Pat. No. 6,098,029 "Liquid-Level Position Measuring Method And System".
[7] U.S. Pat. No. 6,516,661 "Volume Measurement System And Method For Volume Element Counting".

U.S. Pat. No. 6,697,104 [1] discloses a video based system and method for detecting and counting persons traversing at least two areas being monitored. The method includes the steps of initialization of at least one end unit, having at least a camera, the camera producing images of at least a first area being monitored and a second area being monitored, digitizing the images and storing the digitized images in a non-volatile memory unit and a working memory unit; detecting potential persons in the images; comparing the digitized images of objects detected in the first area and second area being monitored with digitized images stored in the working memory unit to determine whether the detected object is a new figure in such area or whether the detected object is a known figure that has remained within such area and to determine that a figure which was not detected has left such area; incrementing a counter for such area with an indication of the number of persons that have passed through such area, and comparing the number of persons passing through a first area with the number of persons passing through a second area.

WO No. 9110972 [2] discloses an Apparatus for counting sheets lying on each other, including: (I) a camera which is positioned in front of one side of the stack of sheets and is movable along the vertical extension of the stack side and has a beam path which presents (i) an objective, which is directed towards the stack side; (ii) an opening which is in the form of a slit such that light emanating from the side edge of one sheet at a time can pass through the opening; (iii) a photodetector which registers the light passing through the opening; (II) a light source arranged for vertical movement along the stack side and which at a substantially constant intensity obliquely illuminates the stack side; (III) mean with which the light intensity value is assigned to the position on the stack side at which the value was measured; (IV) mean with which the total number of sheets in the stack are calculated based on light intensity values.

U.S. Pat. No. 6,738,723 [3] discloses a semi-automated pill counting system using digital imaging technology and image recognition software including a modified Hough Transform. The system comprises a light source; a modified pharmacist's tray; a digital camera; and a personal computer (PC), with the PC storing and executing the image recognition software. A roughly estimated number of pills are placed upon the tray and illuminated by the light source, whereafter a digital image of the pills is produced by the camera and sent via an interface to the PC. The image recognition software counts the pills present in the image and displays a count result. Based upon the count result, the pharmacist adds or removes pills to the tray, as appropriate, to complete the process.

U.S. Pat. No. 6,137,855 [4] discloses a device for counting the number of corrugated articles in a stack of corrugated articles includes a light source for illuminating a multi-article containing surface of the stack of corrugated articles. An electro-optical image capturing camera captures a first visual image frame of a first segment of the multi-article containing surface, and a signal converting means converts the first visual image frame into a first electronic frame signal representative of the first visual image frame. A central processing unit, a frame grabber circuit and software process the first electronic frame signal into a first series of article signals representative of the series of individual articles of the first segment of the multi-article containing surface. The processor also counts the number of individual articles in the first series of article signals. The camera is mounted on a belt track assembly and movable by a stepper motor from a first position to a second position for permitting the camera to capture a second visual image frame of a second segment of the multi-article containing surface.

EP Patent No. 0743616 [5] discloses an apparatus and method for counting sheets of thin media is provided by illuminating with an LED array the edge of a plurality of sheets. A linear CCD array camera receives the reflected light from the sheets, and generates a signal waveform responsive to variations in the reflected light corresponding to the sheets. A digitizer then converts the signal into a digital signal waveform for storage in a video buffer. The stored signal waveform is thereafter processed along one dimension of said edge using a digital signal processor for locating the positions of the sheets in the waveform, and then counting the sheets. Preferably, the linear CCD array camera provides a one-dimensional image of the edge however a two-dimensional CCD array may be used with additional signal processing to translate its two-dimensional signal into a one-dimensional signal. The apparatus further can locate in the signal waveform rigid portions called stiffener boards which border the plurality of sheets or lie at intervals between the sheets.

U.S. Pat. No. 6,098,029 [6] discloses an invention designated to measure the height of a liquid surface automatically by an image processing. The situation over a side wall and the situation of the liquid surface in the image, as taken from an ITV camera, of the neighborhood of the liquid surface are image-analyzed to estimate the boundary position between the side wall and the liquid surface thereby to determine the position of the liquid surface on the image, and the liquid-surface position on the image is transformed from an image coordinate system to a real spatial coordinate system to determine a real position of the liquid surface.

U.S. Pat. No. 6,516,661 [7] discloses a volume measurement system uses volume element counting in determining the amount of a liquid such as fuel in an irregularly-shaped container such as a fuel tank which can have changing orientation. The container is conceptually divided up into a plurality of volume elements. An orientation sensor determines the orientation of the container or of the liquid surface, which is approximated as a plane. A computational or optical processor uses orientation data to project vectors representing the volume elements onto a direction normal to the liquid interface plane. These projected distances are then arithmetically or optically compared to the location of the liquid interface plane.

There is a need in the art for a system and method for counting objects and measuring volumes which is easily operated and can be used for various applications and is not limited to a specifically designated, object, task or environment.

SUMMARY OF THE INVENTION

According to one aspect of the invention there is provided a universal system for counting objects and measuring volumes comprising:
a camera;
an image processor associated with said camera, the image processor is capable of performing any one of object counting and volume measuring;
a data storage coupled to said processor, the storage configured to store data indicative of reference application specific parameters; said camera and image processor are configured to perform at least the following:
 (1) construct an image model;
 (2) capture a measured image that includes at least one object for counting or volume for measuring;
 (3) use said image model and said measured image for determining an area in said measured image indicative of said at least one object or said volume; and
 (4) calculate, from said area and said reference application specific parameters, an estimated number of said at least one object or an estimated quantity of said volume.

According to another aspect of the invention there is provided a universal calibration system for counting objects and measuring volumes comprising:
a camera;
an image processor associated with said camera, the image processor is capable of performing any one of object counting and volume measuring;
a data storage coupled to said processor; said camera and said image processor are configured to perform at least the following:
 (1) construct an image model;
 (2) capture a measured image that includes at least one sample object or sample volume;
 (3) receive from a user a value indicating a number of said at least one sample object or a quantity of said sample volume;
 (4) use said image model and said measured image for determining an area in said measured image indicative of said at least one sample object or said sample volume; and
 (5) calculate from said value, and said area, reference application specific parameters and store said reference application specific parameters in said data storage.

According to another aspect of the invention there is provided a method for counting objects and measuring volumes, the method comprising:
 (1) storing data indicative of reference application specific parameters;
 (2) constructing an image model;
 (3) capturing a measured image that includes at least one object for counting or volume for measuring;
 (4) using said image model and said measured image for determining an area in the measured image indicative of said at least one object or said volume; and
 (5) calculating, from said area and said reference application specific parameters, an estimated number of said at least one object or an estimated quantity of said volume.

According to another aspect of the invention there is provided a calibration method for counting objects and measuring volumes, the method comprising:
 (1) constructing an image model;
 (2) capturing a measured image that includes at least one sample object or sample volume;
 (3) receiving from a user a value indicating a number of said at least one sample object or a quantity of said sample volume;
 (4) using said image model and said measured image for determining an area in said measured image indicative of said at least one sample object or said sample volume; and
 (5) calculating, from said value, and said area, reference application specific parameters, and storing said reference application specific parameters.

According to another aspect of the present invention there is provided universal system for counting objects of various sizes and shapes comprising:
a camera;
an image processor associated with said camera, the image processor is configured to count objects of a given size and shape from among said various sizes and shapes;
a data storage coupled to said processor, the storage configured to store data indicative of reference application specific parameters; said camera and image processor are configured to perform at least the following:
 (1) construct an image model under first ambient conditions;
 (2) capture a measured image that includes at least one object for counting under second ambient conditions;
 (3) update either or both of said image model and measured image in accordance with either or both of said first ambient or second ambient conditions respectively, giving rise to an updated image model and an updated measured image having substantially common conditions;
 (4) use said updated image model and said updated measured image for determining an area in said measured image indicative of said at least one object; and
 (5) calculate, from said area and said reference application specific parameters, an estimated number of said at least one object.

According to another aspect of the present invention there is provided a universal calibration system for counting objects of various sizes and shapes comprising:

a camera;

an image processor associated with said camera, the image processor is configured to count objects of a given size and shape from among said various sizes and shapes;

a data storage coupled to said processor; said camera and said image processor are configured to perform at least the following:

(1) construct an image model under first ambient conditions;

(2) capture a measured image that includes at least one sample object under second ambient conditions;

(3) Update either one or both of said image model and said measured image in accordance with either or both of said first ambient conditions or said second ambient conditions respectively, giving rise to an updated image model and updated measured image having substantially common conditions;

(4) receive from a user a value indicating a number of said at least one sample object;

(5) use said updated image model and said updated measured image for determining an area in said measured image indicative of said at least one sample object; and (6) calculate from said value, and said area, reference application specific parameters, and store said reference application specific parameters in said data storage.

According to another aspect of the present invention there is provided a method for counting objects of various sizes and shapes, the method comprising:

(1) storing data indicative of reference application specific parameters;

(2) constructing an image model under first ambient conditions;

(3) capturing a measured image that includes at least one object for counting under second ambient conditions;

(4) updating either or both of said image model and said measured image in accordance with either or both of said first ambient conditions or said second ambient conditions, giving rise to an updated image model and an updated measured image having substantially common conditions;

(5) using said updated image model and said updated measured image for determining an area in the measured image indicative of said at least one object; and (6) calculating, from said area and said reference application specific parameters, an estimated number of said at least one object.

According to another aspect of the present invention there is provided a calibration method for counting objects of various sizes and shapes, the method comprising:

(1) constructing an image model under first ambient conditions;

(2) capturing a measured image that includes at least one sample object under second ambient conditions;

(3) updating either or both of said image model and said measured image in accordance with either or both of said first ambient conditions or said second ambient condition, giving rise to an updated image model and an updated measured image having substantially common conditions;

(4) receiving from a user a value indicating a number of said at least one sample object;

(5) using said updated image model and said updated measured image for determining an area in said measured image indicative of said at least one sample object; and (6) calculating, from said value, and said area, reference application specific parameters, and storing said reference application specific parameters.

According to another aspect of the present invention there is provided a universal system for measuring volumes comprising:

a camera;

an image processor associated with said camera, the image processor is configured to measure volumes;

a data storage coupled to said processor, the storage configured to store data indicative of reference application specific parameters; said camera and image processor are configured to perform at least the following:

(1) construct an image model under first ambient conditions;

(2) capture a measured image that includes a volume for measuring under second ambient conditions;

(3) update either or both of said image model and measured image in accordance with either or both of said first ambient or second ambient conditions respectively, giving rise to an updated image model and an updated measured image having substantially common conditions;

(4) use said updated image model and said updated measured image for determining an area in said measured image indicative of said volume; and (5) calculate, from said area and said reference application specific parameters, an estimated quantity of said volume.

According to another aspect of the present invention there is provided a universal calibration system for measuring volumes comprising:

a camera;

an image processor associated with said camera, the image processor is configured to measure volumes;

a data storage coupled to said processor; said camera and said image processor are configured to perform at least the following:

(1) construct an image model under first ambient conditions;

(2) capture a measured image that includes at least one sample volume under second ambient conditions;

(3) Update either one or both of said image model and said measured image in accordance with either or both of said first ambient conditions or said second ambient conditions respectively, giving rise to an updated image model and updated measured image having substantially common condition;

(4) receive from a user a value indicating a quantity of said sample volume;

(5) use said updated image model and said updated measured image for determining an area in said measured image indicative of said sample volume; and (6) calculate from said value, and said area, reference application specific parameters, and store said reference application specific parameters in said data storage.

According to another aspect of the present invention there is provided a method for measuring volumes, the method comprising:

(1) storing data indicative of reference application specific parameters;

(2) constructing an image model under first ambient conditions;

(3) capturing a measured image that includes at least one volume for measuring under second ambient conditions;

(4) updating either or both of said image model and said measured image in accordance with either or both of said first ambient conditions or said second ambient conditions, giving rise to an updated image model and an updated measured image having substantially common conditions;

(5) using said updated image model and said updated measured image for determining an area in the measured image indicative of said volume; and (6) calculating, from said area and said reference application specific parameters, an estimated quantity of said volume.

According to another aspect of the present invention there is provided a calibration method for measuring volumes, the method comprising:

(1) constructing an image model under first ambient conditions;

(2) capturing a measured image that includes at least one sample volume under second ambient conditions;

(3) updating either or both of said image model and said measured image in accordance with either or both of said first ambient conditions or said second ambient condition, giving rise to an updated image model and an updated measured image having substantially common conditions;

(4) receiving from a user a value indicating a quantity of said sample volume;

(5) using said updated image model and said updated measured image for determining an area in said measured image indicative of said sample volume; and (6) calculating, from said value, and said area, reference application specific parameters, and storing said reference application specific parameters.

In accordance with certain embodiments of the present invention a universal counting and measurement system and method is disclosed. Unlike other systems and methods known in the art, the system and method disclosed herein are universal, i.e. are not restricted to a specific application, or aimed at counting a specific type of object, but are rather capable of counting objects of a large variety of sizes and shapes, for example: flat, round, square, symmetrical and asymmetrical. According to certain embodiments, the system and method of the present invention are also capable of measuring volumes of materials held within a container or piled on a surface. The shape of the container holding the material, or the shape of the pile of material is not limited to a certain prescribed architecture. In addition, in accordance with certain embodiments, the invention is able to operate in different environments, such as: indoors, outdoors, on a factory floor, inside a closed container, in a parking lot, in a field, on a moving platform etc. The system of the present invention is easily adapted to the different applications and can be made ready to operate in a short time. The system is also capable of counting accumulating objects or measuring accumulating volumes within one or more containers or piles. The system is initially calibrated to the requested application in a simple calibration procedure. Once the system is calibrated, counting (or measuring) can be performed.

It should be noted that, unless specified otherwise, any description disclosed herein pertaining to the application of counting objects is equally directed to the application of measuring volumes of liquid or solid materials and that any description pertaining to the application of measuring volumes of liquid or solid materials is equally directed to the application of counting objects.

BRIEF DESCRIPTION OF THE DRAWINGS

In order to understand the invention and to see how it may be carried out in practice, an embodiment will now be described, by way of non-limiting example only, with reference to the accompanying drawings, in which:

FIG. 9 illustrates an example of an application for counting pages on a printer machine, in accordance with an embodiment of the invention; and FIGS. 10 and 11 are respective graph and table showing results of a calibration process.

DETAILED DESCRIPTION OF EXEMPLARY EMBODIMENTS

Unless specifically stated otherwise, as apparent from the following discussions, it is appreciated that throughout the specification discussions, utilizing terms such as "processing", "computing", "calculating", "determining", and "executing" or the like, refer to the action and/or processes of a computer or computing system, or processor or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may use terms such as processor, computer, apparatus, system, module, unit and device (in single or plural form) for performing the operations herein. Any one of the above may be specially constructed for the desired purposes, or it may comprise a general-purpose computer selectively activated or reconfigured by a computer program stored in the computer. Such a computer program may be stored in a computer-readable storage medium, such as, but not limited to, any type of disk including: optical disks, CD-ROMs, magnetic-optical disks, read-only memories (ROMs), random access memories (RAMs) electrically programmable read-only memories (EPROMs), electrically erasable and programmable read only memories (EE-PROMs), magnetic or optical cards, or any other type of media suitable for storing electronic instructions, and capable of being coupled to a computer system bus.

The processes/devices (or counterpart terms specified above) and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Figure 1:
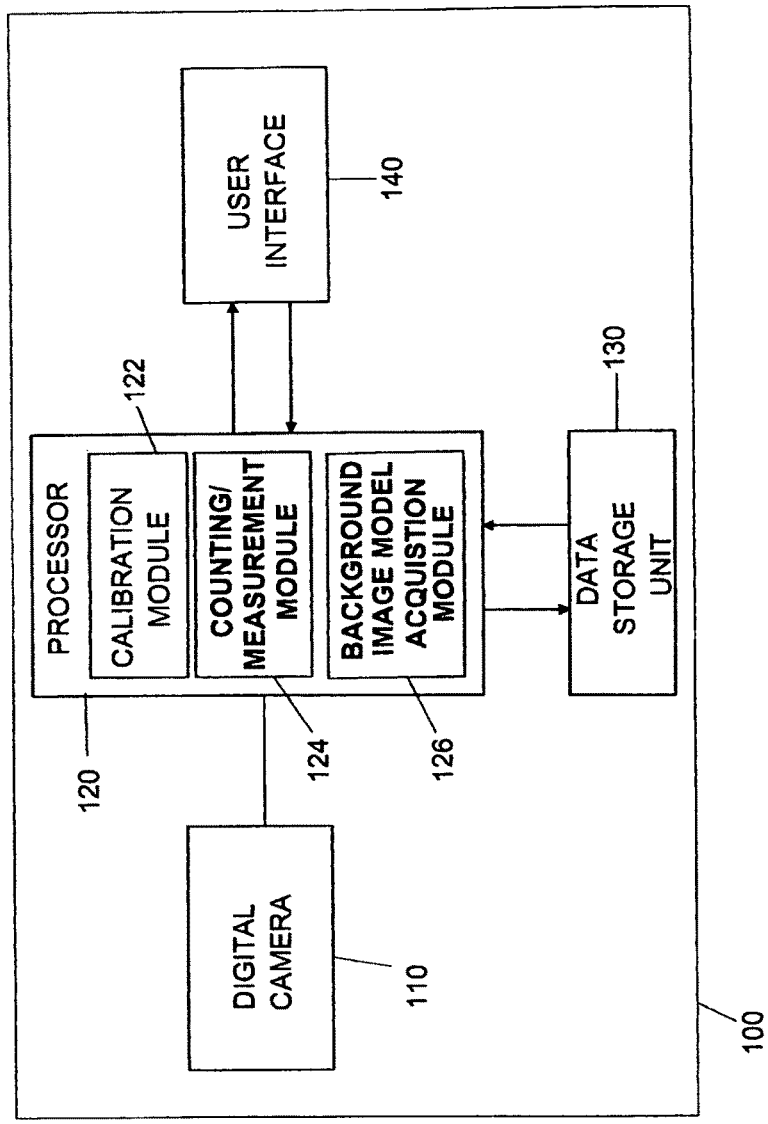
FIG. 1 illustrates a generalized scheme of the system architecture, in accordance with an embodiment of the invention.

Bearing this in mind, attention is drawn to FIG. 1, illustrating a generalized scheme of the system architecture 100, in accordance with an embodiment of the invention. The camera 110 shown in FIG. 1 may be any image acquisition device with a digital output that provides a resolution and frame rate compatible with the application at hand. For example: an application for counting fast moving objects, such as cars on a highway, would require high frame rate (e.g. 60 frames per second). On the other hand, an application for counting slowly moving objects, such as cars moving on an assembly line, would require slow frame rate (e.g. 1-5 frames per second). The resolution of the camera must also comply with the requirements of the application. For example: an application for accurate counting of numerous objects, such as counting 10000 pills, would require a high resolution camera (e.g. 10 million pixels) and an application for estimating a relatively small number of objects, for example a 100 candies, would require lower resolution (e.g. VGA).

Also shown in FIG. 1 a processor 120 associated with the camera and configured to perform the general processing, as will be explained in greater detail below. As shown in FIG. 1, according to certain embodiments, the processor comprises a calibration module 122, a counting and measurement module 124 and background image model acquisition module 126. The processor may be embedded within the camera as an integral component of the camera. Alternatively the processor may be directly or indirectly connected as an external component of the camera. The connection between the camera and the processor may be realized through any connection or communication means presently known or yet to be devised in the future. The communication may be implemented by hardwire or wireless communication means. The processor may be positioned in close proximity to the camera, in a distance ranging from a few millimeters to a few meters or else the distance between the processor and the camera may be very long, covering many miles.

The calibration module 122 facilitates the adaptation of the system to a specific application. For example, the system may be adapted to counting objects such as printed papers, and the next day reinstalled and recalibrated to count cars in a parking lot or to measure volumes. The calibration module allows adjusting the system for counting or measuring each type of these objects or volumes.

The counting and measurement module 124 is used to calculate the number of objects or the volume displayed before the camera. The calculation is executed by using the captured images, containing the objects to be counted or the volume to be measured, and the data obtained during calibration.

The background image model acquisition module 126 calculates a background image model (in short: image model) which is a representation of the scene without the counted objects (or volumes).

FIG. 1 also shows a user interface 140 facilitating data input and output, in accordance with an embodiment of the invention. In addition FIG. 1 depicts a data storage unit 130. According to certain embodiments, a data storage unit 130 is configured to store reference application specific parameters which are calculated during calibration, as will be explained in greater detail below.

Figure 2:
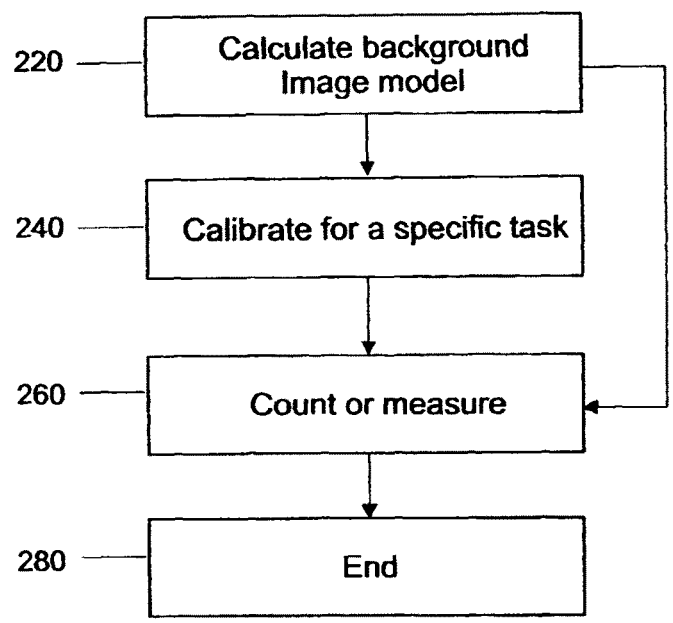
FIG. 2 illustrates a generalized flowchart showing a high level view of the operations carried out in accordance with an embodiment of the invention.

Turning now to FIG. 2, it illustrates a generalized flowchart showing a high level view of the operations carried out in accordance with an embodiment of the invention. During the first stage 220 the background image model acquisition module 126 calculates a background image model. Background image model construction is a prerequisite for any calibration or counting (or measurement) process regardless of the specific application. The background image model is a representation of the scene captured by the camera before objects or volumes are placed. The image model serves to distinguish between pixels representing the original scene without objects (or volumes) and pixels representing objects (or volumes) which are introduced into the scene during the calibration and counting (or measurement) stages. Once the image model has been calculated and stored the system may turn either to the calibration stage 240 or, in case calibration for the requested application, has already been completed in a previous occasion, to the counting (or measuring) stage 260. A more thorough explanation of the image model building procedure is detailed further below with reference to FIG. 3.

According to certain embodiments, the calibration procedure 240 is performed by the calibration module 122. The calibration allows adapting the system to the specific application that is currently being implemented. For example, the system 100 is capable of counting a variety of objects having different shapes and sizes, symmetrical or asymmetrical. In another example, the system 100 is also capable of measuring the volume of liquids or other materials held within containers, or volume of materials piled on a surface (e.g. sand or gravel). The containers holding the material (or the pile of material) may also have different sizes or shapes, regular and irregular. Each of these different applications is characterized by unique parameters and therefore requires the system to be specifically calibrated to the task at hand. It should be noted that since the calibration of the system, for each specific application, takes into account the shape and geometry of the objects, containers or piles, as well as the position and parameters of the camera, it follows that in order to achieve correct counting or measuring, at least a similar geometry and shape of the objects, containers or piles as well as position and parameters of the camera must be maintained during the calibration and counting (or measuring) phases.

After the construction of the background image model and the calibration, the system is ready for performing the required counting or measuring application 260. According to certain embodiments, the counting and measuring 260 is performed by a counting and measuring module 124. Counting and measuring is done by capturing images of the scene which include objects or volumes and comparing these images with the background image model which serves as a reference to the scene without the counted objects or volume. The processor calculates the number of objects or the volumes presented before the camera by using parameters that were obtained and stored during the calibration stage. The counting or measuring procedure may take place immediately after the calibration or at a later stage, whenever the relevant application is required. Moreover, once the system is calibrated for a certain task, there is no limit to the number of times the system can be used for the intended counting or measuring. In addition throughout the operation of the system, the user can return and re-calibrate the system by performing additional calibration cycles in order to improve the accuracy or adjust the system 100. After counting or measuring is completed the operation of the system is terminated 280.

In the following discussion the term "pixel value" refers to grey level with values of 0-255 with 8 bit per pixel (BPP). In most cases a camera using grey level is adequate for performing counting and measuring as disclosed herein. However, anyone who is skilled in the art of digital image processing would readily appreciate that other cameras can be used for implementing the system and method of the present invention. For example, the camera may have other BPP values, larger or smaller than 8 (e.g. 12 and 16 BPP values are common). Also, the cameras may use color rather than grey level images, such as: RGB, LHS, and LUV etc. In such cases, if the color information is not crucial for the operation of the counting or measuring algorithm, the color information can be transformed to grey level data by any method known in the art. If however, color information is required for the specific application, then the computations below can be adapted to be carried with the color information by using other methods also well known to those skilled in the art. For example, measuring the difference between two grey levels is transformed in the case of RGB pixels to measuring the three-dimensional distances between two points in the three dimensional space of Red, Green, and Blue color.

Figure 3:
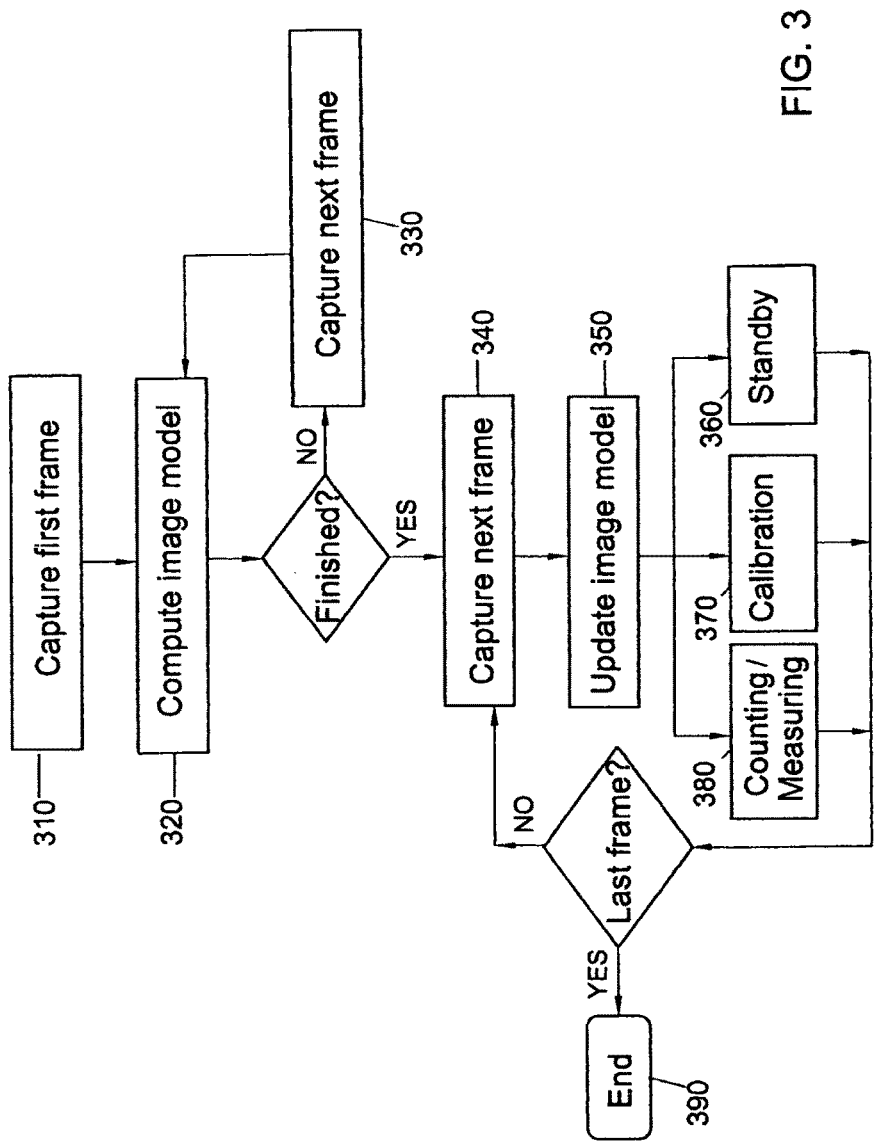
FIG. 3 illustrates a flowchart showing the operations of the system, in accordance with an embodiment of the invention.

Turning now to FIG. 3, there is illustrated a flowchart showing the operations of the system, in accordance with an embodiment of the invention. The first part of FIG. 3, 310-330, describes the process of calculating the background image model. This process is executed by the background image model acquisition module 126, in accordance with certain embodiments of the invention. The camera 110 is situated so as to view at least part of the area on which the counted objects or the volumes, are to be set. The area constitutes the background and is captured by the camera 110 in order to begin establishing the image model. The image model enables the processor to distinguish, during calibration and counting, between pixels pertaining to the counted objects or the measured volumes and pixels pertaining to the background. Upon activation of the system 100 the camera captures a first frame of the scene 310 and starts to compute the background image model 320. The camera continuously captures images of the scene 330. The image model is calculated from the pixel values of all captured frames and is stored for future reference, during the calibration 370 and counting or measuring processes 380. According to certain embodiments the image model is calculated from a predefined number (k) of image frames (typically about a hundred), which are repeatedly captured by the camera 330. According to another embodiment, the image model is calculated from image frames captured during a predefined period of time. Those who are skilled in the art will readily appreciate that there are many known approaches for calculating the image model. A number of non-limiting examples of such algorithms are further detailed below.

According to certain embodiments, after an image model has been calculated, the system may return to standby mode 360. In this mode the system is ready for the next stage, be it calibration 370 or counting (or measuring) 380. While waiting for further instructions 360 the camera continues to capture the scene 340 and to update the pixel values of the background image model 350. This is done in order to adapt the image model to changes that occur in the scene and have an overall effect on pixel values of the image model. Depending on the requested operation, the system may turn from standby mode to calibration or to counting (or measuring) mode. Alternatively the operation of the system may be terminated 390. The image model update rate is preconfigured in the system. According to certain embodiments during the calibration and counting processes after each frame is captured, the image model is continuously updated. Again, this is done to adapt to changes in the scene that have an overall effect on pixel values captured by the camera.

Figure 4:
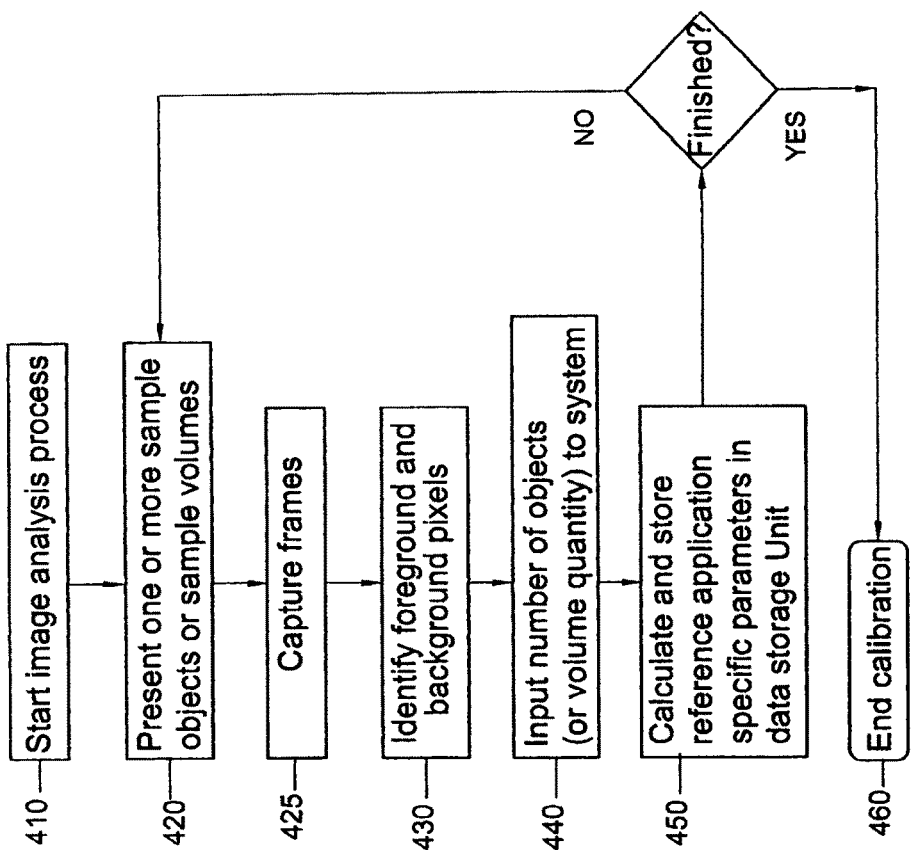
FIG. 4 illustrates a schematic representation of the calibration process in accordance with an embodiment of the invention.

Turning now to FIG. 4, it illustrates a schematic representation of the calibration process in accordance with an embodiment of the invention. The calibration process follows the initial stages of image analysis 410 as depicted in FIG. 3 and which includes the construction of the background image model. According to certain embodiments, during the calibration stage the camera continuously captures the scene. A number of sample objects or sample volumes are set before the camera 420 such that at least a part of them is captured 425, thereby obtaining a measured image. The area within the measured image that incorporates one or more sample objects or sample volumes is determined by comparing the measured image to the image model that was previously calculated. According to certain embodiments, in order to detect which pixels within the measured image are indicative of the sample object or sample volume and constitute the area mentioned above, the pixel value of each pixel within the measured image is compared with the value of its equivalent pixel within the image model and pixels showing a value difference between the two images, which is higher than a predefined threshold, are determined as indicative of the sample object or sample volume. According to certain embodiments of the invention pixels showing a significant pixel value difference between the two images are classified as foreground (i.e. new) pixels and pixels that do not show such a difference are classified as background (i.e. old) 430. A total number representing the sum of all foreground pixels, indicative of the one or more sample objects or sample volume, is calculated. Algorithms for calculating the background image model and for comparing the image model with a measured image are described in further detail below. Next, the user inputs, via the system's user interface 140, a value which equals to the actual number of objects or the quantity of the volume that was presented and captured by the camera 440. Finally, reference application specific parameters are calculated and stored 450 in the system's data storage unit 130.

More specifically in accordance with certain embodiments, reference application specific parameters pertain to a measured pixel count and the corresponding number of objects or volume. According to a certain embodiment reference application specific parameters are represented by the number of pixels constituting a single object and are calculated by dividing the total number of pixels, which constitute the sample objects, within the measured image, and the actual number of objects, inputted by the user. It should be noted that due to different angles of the displayed objects in respect to the camera, objects shading other objects in a pile, changes in light conditions or other additional reasons, it is expected that the same number of objects, captured at different times, may produce different reference application specific parameters. It should also be noted that for the reasons specified above, capturing a linearly accumulating number of objects may produce pixel values with non-linear behavior. Therefore, according to certain embodiments, the calibration step is repeated several times for the purpose of gaining more accurate results.

Figure 10:
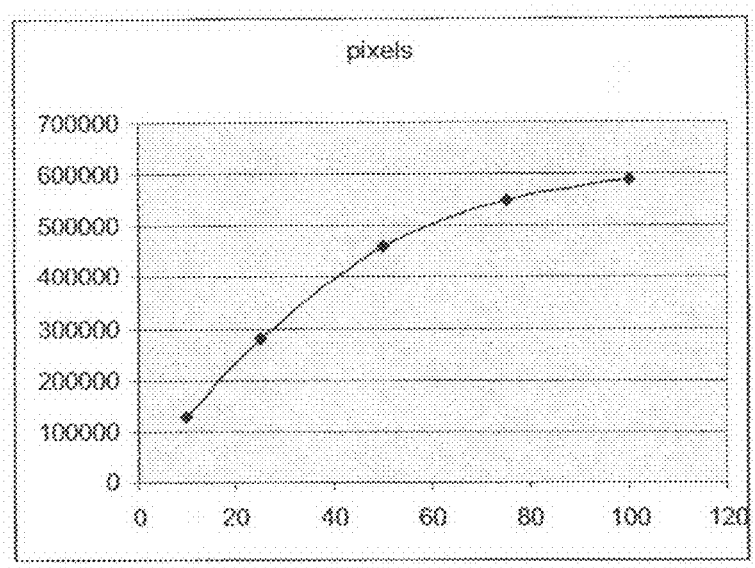

Accordingly, in certain embodiments, each repetition includes placing the same number of objects before the camera 110 in order to avoid miscalculation due to potential noise and other factors pertaining to one or more images taken under certain ambient conditions. According to certain embodiments, reference application specific parameters are obtained from a plurality of indexes. Each index pertains to a number of pixels, indicative of a specific number of captured objects (or volumes) as captured by the camera 110, and the corresponding number of objects (or volume sizes) that was inputted by the user. In some embodiments, wherein the relationship between the objects (or volumes) and measured pixel numbers exhibits a linear or close to linear correlation, a simple formula is inferred from the calculated indexes. For example: number of objects=alpha*number of foreground pixels+beta. The computed coefficients alpha and beta are stored in the data storage unit 130. In other embodiments, wherein the calculated correlation between object numbers and pixels numbers is non-linear, a more complicated formula which represents the calculated correlation may be inferred by ways well known in the art. According to certain embodiments the indexes are stored within a lookup table. For example, consider an application for counting small items with a range of 0 to 200 items in each counting procedure and with an image having a total of 1,000,000 pixels (background and foreground pixels together). The calibration process produced the following lookup table: first index: 10 items—130,000 foreground pixels; second index: 25 items—280,000 foreground pixels; third index: 50 items—460,000 foreground pixels; fourth index: 75 items—550,000 foreground pixels; and fifth index: 100 items—590,000 foreground pixels (see Graph 1). These indexes are now used by the system to compute a formula and interpolated and extrapolated values, providing for each number of pixels from 0-1,000,000 the best estimate of the corresponding number of objects. For a detailed lookup table containing a large number of indexes, which is therefore more accurate, the calibration process should be executed repeatedly, each time with a different number of objects or with a different sample volume. FIG. 11 shows some examples of measured foreground pixels and the number of objects calculated in accordance with the values of the above example shown in FIG. 10.

Different applications may require different degrees of counting or measuring accuracy. The accuracy of the calculation during counting and measuring is dependent, inter alia, on the number of indexes within the lookup table. For example, an application for counting medical pills may require finding the precise number of pills. On the other hand, an application for counting candies may make do with an estimated number of candies. A lookup table showing the correlation between the pile size in pixels and the number of candies or pills in each pile would allow calculating the number of candies or pills in a given pile during the counting stage. A greater number of indexes, and therefore a more precise formula, are required for counting pills than for counting candies. In another example, in a volume measurement application where the container holding the volume is characterized by a regular shape, it may be very likely that a small number (possibly one) of the indexes would be sufficient to obtain an accurate result during measuring. In accordance with an embodiment of the present invention the term regular shape pertains to a container characterized by a uniform shape having a constant ratio between the height of the liquid within the container and the volume of the liquid. On the other hand, volumes held in a container with irregular shape, characterized by a variable relationship between the level and the volume of liquid, require a greater number of indexes and a more detailed lookup table for obtaining accurate measuring.

In view of the above it should be noted that the system, in accordance with certain embodiments, calculates an estimated number of objects or an estimated quantity of volume during counting and measuring. In certain embodiments the estimated number or quantity is the exact number or quantity presented before the camera. In other embodiments the estimated number or quantity is an approximation, with varying degree of accuracy, of the actual number or quantity present before the camera.

According to certain embodiments, during the calibration process 240 the accuracy of the system 100 can be estimated. Those skilled in the art will readily appreciate that there are many approaches for estimating the accuracy of the system. Two non-limiting examples hereby follow:

The estimation of the system's accuracy can be based on the calculated relationship between the measured number of pixels indicative of the sample objects (or sample volumes) captured by the camera and the actual number of objects (or volumes). First, a few rounds of calibration must be performed, where in each round a known number of objects are presented before the camera and the corresponding number of foreground pixels is calculated. Next an average measured number of pixels indicative of a single object and a standard deviation value should be calculated. A large standard deviation implies that the results obtained for the specific application are inaccurate and therefore a large number of indexes are required for calculating accurate results during the counting (or measuring) procedure. On the other hand a small standard deviation implies that the specific application may make do with a small number of indexes in order to obtain accurate results during counting (or measuring).

Alternatively, the accuracy of the system may be predicted by first calibrating the system and then counting the same number of objects several times. The system's accuracy can be obtained by comparing the results of this repeated counting with the actual number of objects. The error between the counted number of objects and the actual number of objects should be calculated. Similar to the previous example, an average and standard deviation of the errors can be calculated and used for the purpose of estimating the accuracy of the system. A small standard deviation value implies that the calculated error rate is consistent, suggesting that the system is accurate. In this case the results obtained by the system can be corrected by a value equal or close to the calculated average error rate. On the other hand, a large standard deviation value implies that the calculated error rate is inconsistent, suggesting that the system is inaccurate.

During the calibration process 240 the image model is updated 350 in order to adapt to changes in ambient conditions. These changes may have a general effect on the scene and therefore require readjusting the system for future calibration rounds or future counting (or measuring). In certain embodiments, changes in ambient conditions may induce an overall change in pixel value, which is above the required threshold of distinction between background and foreground pixels. This, for example, can be the result of a sudden change in light conditions. In other embodiments, changes in ambient conditions may induce an overall change in pixel value, which is lower than the required threshold of distinction between background and foreground pixels, representing slow changes occurring in the scene. Both types of changes may induce differences in the calculated values of the image model and the measure image and may therefore cause miscalculations during the calibration (or counting and measuring) stage when the image model is compared to the measured image. According to certain embodiments, in order to reduce the effect of the changes in the ambient conditions and to give rise to an image model and a measured image having common ambient conditions, the image model is repeatedly updated and its pixel values are adapted according to the changed ambient conditions. According to other embodiments, instead of updating the image model, the measured image is updated and its pixel values are adapted according to the ambient conditions, which were present during the construction of the image model, while the pixel values of the image model stay constant. According to a further embodiment, both image model and measured image are updated and their pixel values are adapted to a third set of values corresponding to common (e.g. normalized) values calculated from the first ambient conditions of the image model and the second ambient conditions of the measured image.

According to a first embodiment the update is performed after a predefined period of time and according to a second embodiment the update is performed after a predefined number of frames (e.g. after each frame).

After a sufficient number of calibration cycles are completed, the calibration process is terminated 460. Throughout the operation of the system 100 calibrations can be repeated, updated or improved. The user may recalibrate the system by erasing the previously calculated application specific parameters, or perform more calibration cycles in order to improve or update previous calibrations.

Figure 5:
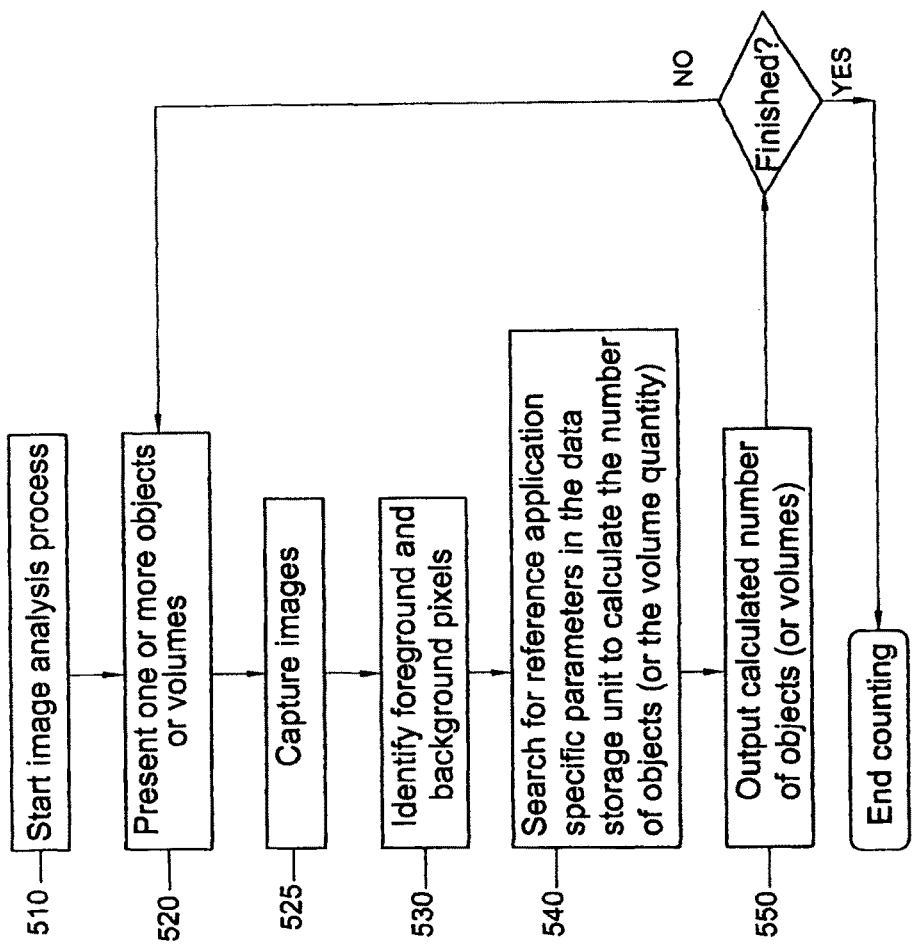
FIG. 5 illustrates a schematic representation of the counting and measuring processes in accordance with an embodiment of the invention.

Reverting now to FIG. 5, it illustrates a schematic representation of the counting and measuring processes in accordance with an embodiment of the invention. After calibration, the system is ready for performing the required counting or measuring application 260. As in the calibration stage, the counting or measurement process starts with the initial image analysis process 510 which includes the construction of a background image model. According to certain embodiments, after the image model is determined, one or more objects for counting or volume for measuring are placed before the camera 520, in the same manner that was earlier described for the calibration stage. As in the calibration stage, the camera captures the objects (or volume) 525, thereby obtaining a measured image, this time showing the objects (or volume) designated for counting (or measuring). The area within the measured image that incorporates the one or more objects or the volumes is determined by comparing the measured image with the previously calculated image model. According to certain embodiments, in order to detect which pixels within the measured image are indicative of the object or volume (and constitute the area mentioned above), the value of each pixel within the measured image is compared with the value of its equivalent pixel within the image model, and pixels showing a value difference between the two images, which is higher than a predefined threshold, are determined as indicative of the object or the volume. According to certain embodiments of the invention pixels showing a significant value difference between the two images are classified as foreground pixels (i.e. new) and pixels that do not show such difference are classified as background pixels (i.e. old) 530. In certain embodiments, wherein only a part of the object (or the volume) is exposed to the camera, the same part that was exposed during calibration must be exposed during the counting (or measuring) procedure in order to obtain accurate counting (or measuring) results.

According to certain embodiments, in order to calculate the actual number of objects (or the actual volume) placed before the camera 110, the processor 120 (via the counting and measuring module 124) searches for the reference application specific parameters that were stored in the data storage unit 130 during the calibration stage 540. According to certain embodiments, wherein the data storage unit 130 contains the coefficients of a simple formula alpha and beta, the counting process consists of using this formula for calculating the number of objects or volumes. In other embodiments wherein the data storage unit contains a lookup table with a list of indexes providing for each pixel count the corresponding number of objects (or corresponding volume) the processor uses the table to extrapolate the number of objects according to the calculated number of pixels indicative of the object (or volume) within the measured image. According to another embodiment, calculation of the actual number of objects or the actual volume is done by inferring from a plurality of indexes, stored within the data storage unit, a mathematical formula representing the relationship between object numbers or volume and pixel count as demonstrated above by FIGS. 10 and 11.

According to certain embodiments, the final output, consisting of the number of counted objects or the quantity of the measured volume, is displayed to the user 550 via a user interface 140. According to other embodiments, the final output may also be printed out, saved on a file, sent by email or otherwise communicated to a remote computer, or stored or presented in any other way known in the art. According to certain embodiments, the system may activate an alarm, turn on a light, stop a machine, send an SMS or activate various types of alerts or operations once the counting (or measuring) procedure has ended or once a certain number of objects (or volume quantity) has been reached.

In certain embodiments the counting or measuring may be performed upon demand, i.e. the objects for counting or volumes for measuring are set before the camera by a person or a machine (e.g. robot) and after the objects are properly placed the system is manually activated to capture and count the number of objects (or volume). According to other embodiments, the system may work automatically, the camera may continuously capture a scene and count objects (or measure volumes) presented before the camera.

According to certain embodiments the system is capable of counting and measuring moving objects. For example: the camera may be situated across from a moving platform (e.g. conveyor belt) while the objects for counting are continuously passing on the moving platform. According to certain embodiments, the system, using the camera 110, continuously captures the scene, each frame is individually analyzed as a single static frame, and the moving objects are identified and their number is calculated. Another example is counting the number of cars entering a parking lot. The camera 110 may be situated as to capture the entrance of the parking lot and thus capture any vehicle that enters the lot. According to certain embodiments, a second camera can be situated at the exit of the parking lot counting the number of exiting cars, thus the total number of cars present in the parking lot at a certain time can be calculated. When counting moving objects, such as in the previous examples, there is a problem of counting parts of objects as whole objects. According to certain embodiments, to solve this problem the system may be configured to only count objects which are surrounded by background pixels.

According to certain embodiments, the system is capable of counting and measuring accumulating objects and volumes. The camera continuously captures the area on which the object or volumes are being accumulated and calculates for each number of frames (e.g. for each frame) the current number of objects or volume quantity. Each calculation of object number or volume is stored or displayed to the user thereby showing the accumulated amounts.

As shown in FIG. 3, in accordance with an embodiment of the invention, throughout the counting (or measuring) process the background image model is updated 350. This is done in order to avoid miscalculation, when comparing the image model and the measured image in future counting (or measuring), due to changes that have occurred in the scene during the counting process, such as changes in illumination, and have an overall effect on pixel values captured by the camera. According to a first embodiment the image model is updated after a predefined period of time and according to a second embodiment the image model is updated after a predefined number of frames (e.g. after each frame).

The following is a description of non-limiting examples of methods for calculating the background image model and calculating the difference between the background image model and a measured image. The examples relate to both the calibration stage and the counting (or measuring) stage. The examples which hereby follow comprise a learning step and a detection step, where the learning step pertains to the construction of the image model and the detection step pertains to the comparison between the image model and the measured image as described above.

A) Average/variance: According to certain embodiments the background image model includes two values for each pixel: average value and standard deviation value. Thus two images, an average value image and a standard deviation value image, are stored and subsequently updated.

Learning step: In this step the image model is constructed. Two images are computed, AvImage (every pixel contains the value of the average value of that pixel) and stdImage (every pixel contains the standard deviation of that pixel). In order to compute these two images with low computational cost, the following is performed. Three counters, sum, sumG and sumGG are set for every pixel and initialized to zero. Then, a predefined number of frames (k) are captured. For every frame, and for every pixel with pixel value G, the counters are updated as follows:

sum+=1,(number of captured frames)

sum$G$+=$G$,(total sum of pixel values)

sum$GG$+=$G$*$G$.

Once the predetermined number of frames has been collected, the values of AvImage and stdImage are computed as follows, for every pixel:

average=sum$G$/sum, std=[(sum$GG$−sum$G$*sum$G$/n)/n]$^{1/2}$

Detection step: for every pixel within the measured image, decide if it is significantly different from the equivalent pixel in the image model (i.e. a foreground pixel): denote by $G_i$ the value of pixel i in the current measured image, $Av_i$ value of pixel i in avImage, $Std_i$ the value of pixel i in stdImage. Then pixel i will be marked as a foreground pixel if and only if $|G_i-Av_i|>$factor*$Std_i$ With factor=1, confidence of this result is 67%, with factor=2, confidence=95%. The relation between factor and confidence value is very well known to anyone skilled in this art.

According to certain embodiments, if the image has no foreground pixels, (i.e. the change in pixel value is less than the required threshold) or if the change in pixel values occurred throughout the entire image, update avImage and stdImage. This is where the background image model is updated to keep track of slow changes in the scene, including illumination changes. The update procedure is as follows: an update factor q is predetermined. The parameter q must be a value between 0 and 1. The update rule is as follows: given a pixel $G_i$ in the current measured image and the current values of $Av_i$—the value of pixel i in avImage, $Std_i$—the value of pixel i in stdImage, the update rule is:

new $Av_i=q*Av_i+(1-q)*G_i$ new $Std_i=(q*Std_i^2+(1-q)*(G_i-Av_i))^{1/2}$

According to certain embodiments, if the image contains foreground pixels (i.e. new), then the measured image is sent to interpretation (for example: counting the number of foreground pixels within the measured image and inferring the number of objects).

B) Derivative: According to certain embodiments, every pixel undergoes a preliminary step of computation of the derivative. The derivative for each pixel is computed with the following computation:

$D_i=F_k\cdot((G_R-G_L)^2+(G_B-G_T)^2)^{1/2}$,

Where $G_R,G_L,G_B$, and $G_T$ are the pixels immediately to the right, left, bottom and top of the current pixel, respectively. This can be easily computed with a lookup table. Alternatively, the derivative can be computed as:

$D_i=F_k\cdot\max(abs(G_R-G_L),abs(G_B-G_T))$.

According to certain embodiments, if the derivative turns out to be bigger than the maximum allowed value, it is trimmed to that value. The normalization factor $F_k$ is chosen to maximize the usage of the dynamic range of the pixel buffer. This is since derivatives are usually very small. Thus the normalization factor $F_k$ often has a value larger than 1, for example 4 or 8. Once a frame has been transformed from raw image to derivative image, its handling can continue with the algorithm described above or other algorithms well known in the art. As a non-limiting example, the derivative approach with the average/standard deviation algorithm described above is hereby disclosed.

Learning step: In this step the background image model is constructed. Two images are computed, AvDImage (every pixel contains the value of the average derivative for that pixel) and stdDImage (every pixel contains the standard deviation of the derivative for that pixel). As before, three counters, Dsum, DsumG and DsumGG are set for every pixel and initialized to zero. Then, a predefined number of frames (k) are captured. For every frame, and for every pixel with derivative value DG, the counters are updated as follows:

$D$sum+=1, $D$sum$G$+=$DG$, $D$sum$GG$+=$DG*DG$.

Once the predetermined number of frames has been captured, the values of AvDImage and stdDImage are computed as follows, for every pixel:

$D$average=$D$sum$G$/$D$sum, $D$std=($D$sum$GG$/$D$sum−($D$sum$G$/$D$sum)$^2$)$^{1/2}$.

Detection step: for every pixel within the measured image, decide if it is significantly different from the equivalent pixel in the image model (i.e. a foreground pixel): denote by $DG_i$ the value of the derivative of pixel i in the measured image, $DAv_i$ value of the derivative of pixel i in avDImage, $DStd_i$ the value of the derivative of pixel in stdDImage. Then pixel i will be marked as a foreground pixel if, and only if $|DG_i-DAv_i|>$factor*$DStd_i$. With factor=1, confidence of this result is 67%, with factor=2, confidence=95%. The correlation between factor and confidence value is very well known to anyone skilled in this art.

According to certain embodiments, if the image has no foreground pixels, update avDImage and stdDImage as described in the earlier example. The update procedure is similar to that shown above: given a derivative value of a pixel $DG_i$ in the current frame and the current values of $DAv_i$—the value of the derivative of pixel i in avDImage, $DStd_i$—the value of the derivative of pixel i in stdDImage, the update rule is:

new $DAv_i=q*DAv_i+(1-q)*DG_i$ new $DStd_i=(q*DStd_i^2+(1-q)*(DG_i-DAv_i))^{1/2}$ These computations can easily be implemented as a lookup table and so require a single pass.

As described above for the previous example, if the image contains foreground pixels, then the measured image is sent to interpretation (for example: counting the number of foreground pixels within the measured image and inferring the number of objects). It should be noted that the examples detailed above are by no way limiting and are given by way of illustration only. Any person having ordinary skill in the art would readily acknowledge that there are other well known methods and algorithms for performing the task described above.

Having described the calibration and counting (or measuring) procedures, hereby follow non-limiting examples of calibration procedures for performing different types of counting and measuring applications, in accordance with certain embodiments of the invention.

Figure 6:
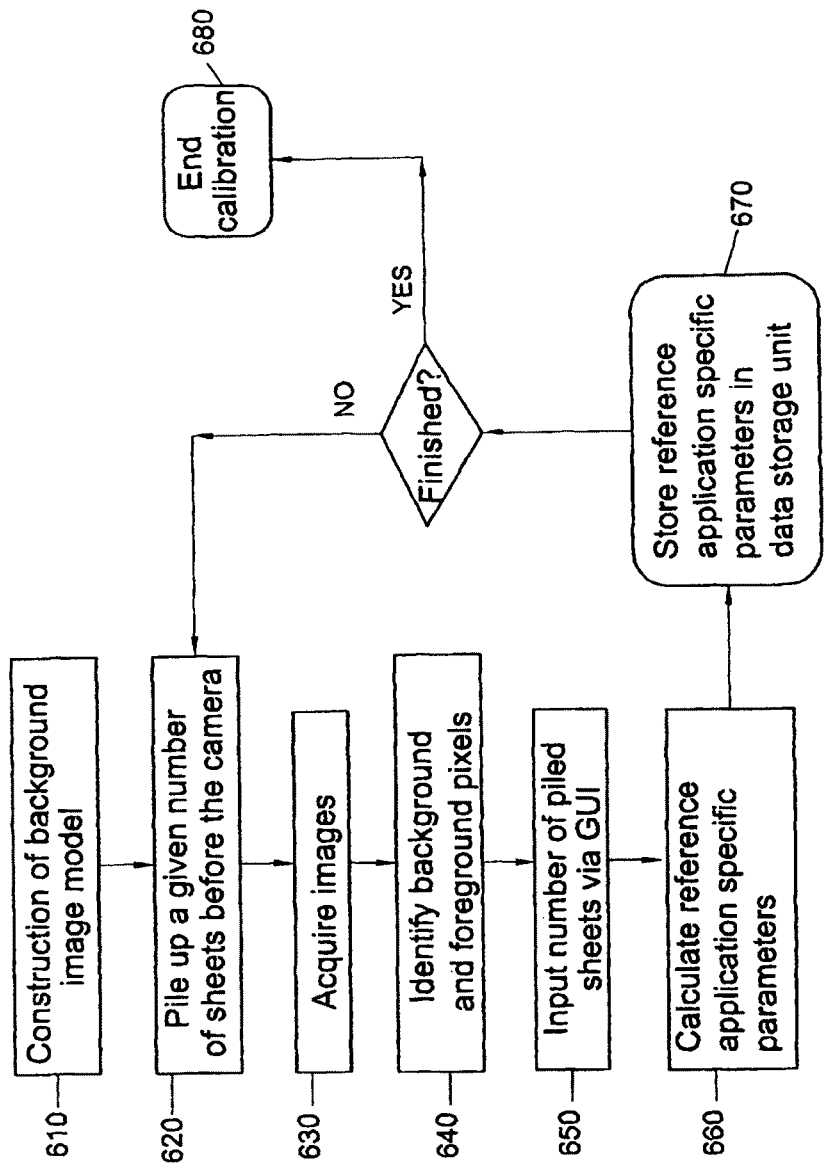
FIG. 6 illustrate schematically a calibration process of the system for counting planar sheets, in accordance with an embodiment of the invention.

FIG. 6 illustrates schematically a calibration process of the system for counting planar sheets, in accordance with an embodiment of the invention. This application may suit counting any type of planar objects which are piled one on top of the other. First the background image model is calculated 610 as previously explained with regard to FIG. 3. Once the image model has been calculated, a sample pile of a given number of sheets is situated before the camera 620. At least a portion of the sample pile is placed within the boundaries of the image model and the camera captures the pile of sheets 630. The processor compares the pixels of the measured image with the pixels of the image model. The area within the image model which is covered by the pile of sheets (in the measured image) is determined. According to certain embodiments the number of pixels indicative of the pile is calculated and pixels are identified as foreground and background pixels, where foreground pixels are indicative of the sheets and the background pixels are indicative of the image model which is not covered by the sheets 640. According to certain embodiments, the user, via a user interface 140, enters the actual number of sheets that constitute the pile 650. Next, the calibration module 122 calculates reference application specific parameters 660.

In certain embodiments, a plurality of indexes showing the relationship between a specific number of sheets captured by the camera and a number of pixels indicative of the specific number of sheets, is stored 670 in a data storage unit 130. In further embodiments the data storage unit includes a lookup table. In certain embodiments a mathematical formula, which represents the relationship between pixel number and the number of sheets it corresponds to, is inferred from the stored indexes. According to this embodiment the process is repeated several times, where each time a different number of sheets are stacked, constructing a detailed lookup table holding indexes pertaining to piles of sheets of different sizes. In certain embodiments the calibration process described above is repeated with the same pile containing the same number of sheets in order to obtain more accurate results as explained above. Once a predefined number of calibration cycles are executed, the calibration stage is terminated 680.

Figure 7:
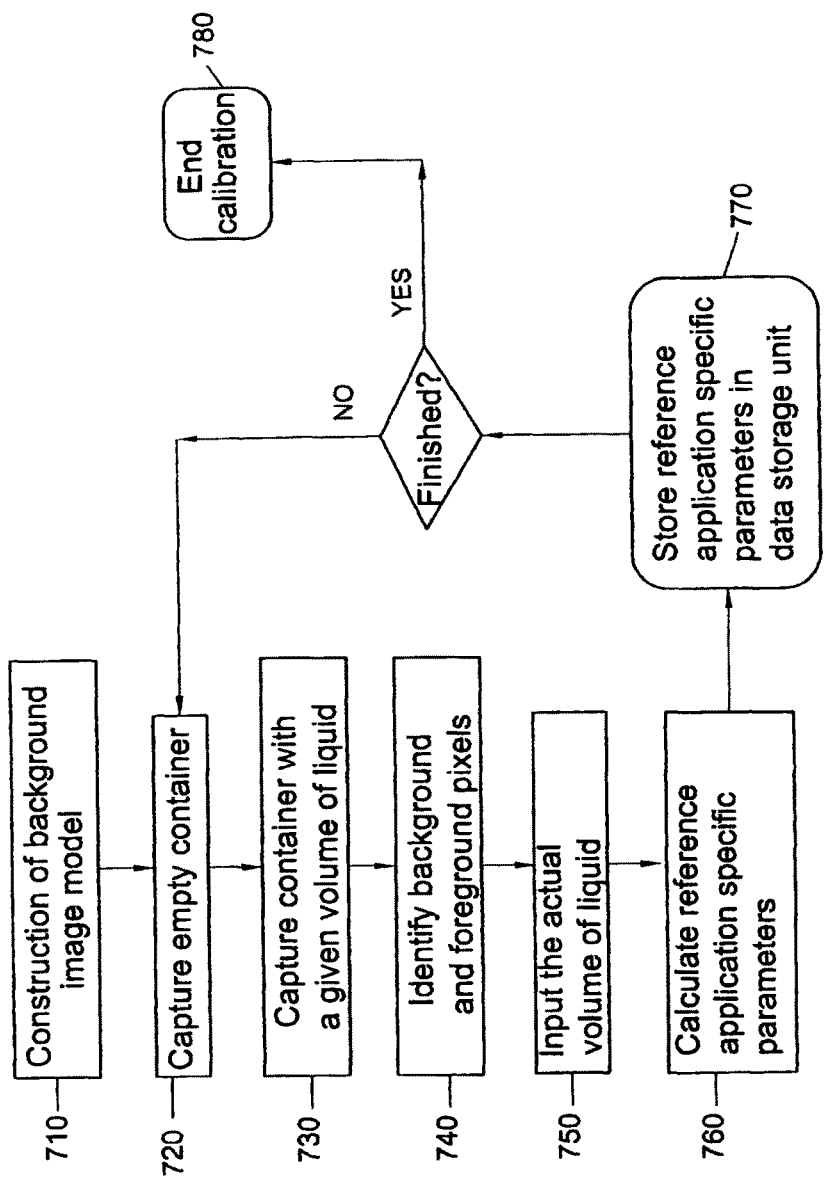
FIG. 7 illustrates schematically a calibration process of the system for measuring liquid volumes, in accordance with an embodiment of the invention.

Turning now to FIG. 7, it illustrates schematically a calibration process of the system for measuring liquid volumes, in accordance with an embodiment of the invention. The application described in FIG. 7 refers to a method of calibrating the system for calculating the volume of liquid or other material within a container regardless of the shape of the container. As mentioned above, the image model construction stage 710 is a prerequisite for all calibration processes, and it therefore precedes the calibration described in FIG. 7 as well. In certain embodiments one or more images of an empty container are captured by the camera 720, allowing the processor to study the visual image of the container. A given sample volume of liquid is inserted into the container and placed before the camera in a similar fashion to that described with regard to the previous application. The camera captures a measured image of the container holding the sample volume of liquid 730. According to certain embodiments, the camera captures the projection line of the liquid level respective to the background image model and the contours of the container. The processor (via the calibration module 122) compares the measured images of the container holding the liquid with the image model including the empty container. The processor identifies the area within the image model, which is confined under the projection line of the liquid and within the contour lines of the container. According to certain embodiments the number of pixels indicative of that area (i.e. the liquid) is calculated and pixels are identified as foreground and background pixels 740, where foreground pixels are indicative of the liquid within the container and the background pixels are indicative of the area which is not covered by liquid. The user, via a user interface 140, inserts the actual liquid volume within the container 750. Next, reference application specific parameters are determined 760.

According to certain embodiments, wherein the container has a regular shape, a constant relation between the volume of the liquid within the container and the height of the projection line of the liquid level, respective to the image model, is calculated and stored. According to other embodiments, wherein the container is characterized by an irregular shape, the calibration process is repeated several times, each time with a different volume of liquid inserted into the container. The number of foreground pixels, pertaining to each volume of liquid, is stored in the data storage unit 770. In certain embodiments the data storage unit includes a lookup table. The lookup table contains indexes showing the relation between the volume of liquid and the number of pixels indicative of that volume. As mentioned above, with regard to the previous application, in some embodiments a mathematical formula representing the indexes is formulated and used later during the measuring process. In order to obtain a detailed lookup table which will allow the accurate measurement of any liquid volume it is important to repeat the calibration stage several times each time with a different volume. Once a predefined number of calibration cycles are completed the calibration process is terminated 780.

Figure 8:
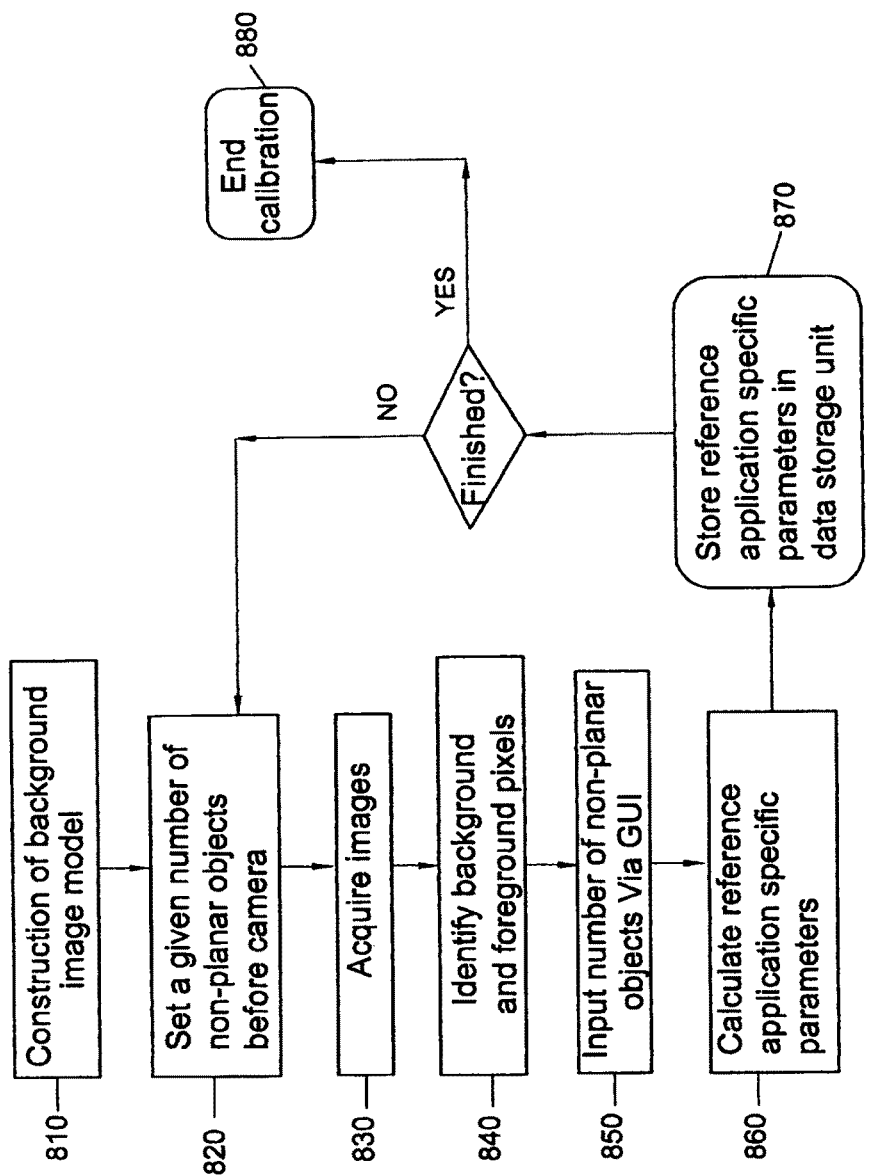
FIG. 8 illustrates schematically the calibration process of the system for counting non-planar objects, in accordance with an embodiment of the invention.

FIG. 8 shows the calibration process of the system for counting non-planar objects, in accordance with an embodiment of the invention. The objects may have symmetric or asymmetric shapes. As before, first an image model is determined 810. Next, a given number of non-planar sample objects are placed 820 and captured by the camera 830. Subsequently the processor distinguishes between foreground and background pixels 840 as described in detail above. The user inputs the actual number of objects 850 that were placed. In certain embodiments, the calibration process is repeated where in each calibration cycle a different number of sample objects are set before the camera. The number of pixels indicative of the number of objects is stored in the data storage unit 870. According to certain embodiments the storage unit contains a lookup table with a list of indexes each showing a specific number of objects and the corresponding number of pixels indicative of that certain number of objects. Once calibration is completed the operation is terminated 880.

The examples specified above describe the calibration of the system 100 for counting or measurement in a controlled environment. With regard to certain embodiments of the present invention a controlled environment is an environment where the only objects entering the scene are of the type being counted by the system. According to other embodiments, calibration of the system may be conducted in an uncontrolled environment. An uncontrolled environment is an environment in which other objects in addition to the ones being counted may appear or disappear. For example, when counting cars in a parking lot, people may pass through the parking lot in front of the camera. Another example is counting products on a production line (e.g. plastic or electronic components) while people and/or machines are moving in the background. This requires from the system the ability to distinguish between objects that should be counted and objects that should be ignored. After the completion of the image model acquisition stage 220, the sample objects are placed before the camera within the boundaries of the image model and the scene is captured by the camera. Next, the processor compares the image of the captured object with the image model and determines which of the pixels are indicative of the captured object. As before, foreground and background pixels are determined. According to certain embodiments, in order to enable the processor to distinguish between objects that should be counted and objects that should be ignored, the processor studies the features of the sample object. If the counted objects have an easily identified feature or features then these features can be used for discerning between objects that should be counted and objects that should be ignored. The following are a number of non-limiting examples of such features: the height and width of the sample object, the total surface of the object, the ratio between height and width of the sample object, and the color or the range of colors of the sample object. For example, if the objects to be counted are pills with clear green markings, and the camera is situated directly above the plate holding the pills, than an object is identified as a pill only if its size is within strictly defined limits and has some green marking on it. This identifies pills clearly from other objects that may be moving in front of the camera, such as moving machine parts or shadows.

If, however, the objects which are being counted are not characterized by an outstanding feature which can identify them in an uncontrolled environment, additional phases of calibration are required. For example, in a parking lot with cars and people, where only the cars are to be counted, if the camera is observing the parking lot with a relatively horizontal line of sight, then cars which are situated near the camera can have a relatively large size (in pixels) and cars situated far from the camera can have a relatively small size (in pixels). In such a situation, an additional phase of calibration may be needed to tabulate the expected size of an object (i.e. car) as a function of its position on the frame. Implementation of such a calibration step is self evident to anyone skilled in the art of designing computer algorithms for machine vision. These features are stored in the data storage unit 130. During the counting or measuring stage 260 the features of an object (or volume) are compared with the stored parameters and a decision is made whether they should be counted or disregarded.

FIG. 9 illustrates an example of an application for counting pages dispensed by a printer, in accordance with an embodiment of the invention. The scene captured by the camera consists of the printer including at least the surface on which the papers exiting from the printer are stacked. FIG. 9a shows the empty surface. The empty surface is captured, analyzed and saved during the image model acquisition stage. FIG. 9b shows 150 printed pages stacked on top of the surface. To count the pages the processor queries the data storage unit for the stored application specific parameters and calculates the number of pages according to the indexes and/or a calculated formula. FIG. 9c shows a stack of 250 printed pages. Due to the angle of the camera with respect to the scene and the shape of the printer, the change in the number of background pixels is not linear i.e. it is not proportional to the actual change in the number of sheets of paper. Therefore, it is impossible to obtain an accurate result using a single ratio as reference. Instead a detailed lookup table is required that contains indexes, each representing a unique relation of pixel number and sheet number.

The present invention has been described with a certain degree of particularity, but those versed in the art will readily appreciate that various alterations and modifications may be carried out, without departing from the scope of the following claims.

The invention claimed is:

1. A universal counting and measuring system for counting objects and measuring volumes comprising
a camera;
an image processor associated with said camera;
a data storage coupled to said processor, the storage configured to store data indicative of reference application specific parameters obtained by a calibration process;
said camera and image processor configured to:
construct a background image model;
capture a measured image that includes at least one object or volume;
if in calibration mode—receive from a user a value indicating a number of said at least one object or a quantity of said volume;
use said background image model and said measured image for determining an area in said measured image indicative of said at least one object or said volume; and
calculate, from said value and said area, reference application specific parameters; and
if in counting or measuring mode—
use said background image model and said measured image for determining an area in said measured image indicative of said at least one object or said volume; and
calculate, from said area and said reference application specific parameters, an estimated number of said at least one object or an estimated quantity of said volume.

2. The system of claim 1 wherein said background image model undergoes periodic updates.

3. The system of claim 2 wherein the periodic updates occur after capturing each frame.

4. The system of claim 1 wherein said reference application specific parameters include pixel-related data that corresponds to said at least one object or said volume.

5. The system of claim 4 wherein said pixel related data is a number selected from the group consisting of: number of pixels and ratio between the number of pixels in different dimensions.

6. The system of claim 1 wherein determining an area, indicative of said at least one object or said volume, comprises comparing foreground pixels indicative of said at least one object or said volume in said measured image, and background pixels indicative of said image model.

7. The system of claim 1 wherein said at least one object is a planar object.

8. The system of claim 7 wherein said at least one planar object comprises two or more planar objects and wherein said two or more planar objects are stacked.

9. The system of claim 1 wherein said at least one object has an asymmetrical shape.

10. The system of claim 1 wherein said volume is held within a container.

11. The system of claim 10 wherein said container has an irregular shape.

12. The system of claim 1 wherein said volume is piled on a surface.

13. The system of claim 1 wherein said measured image includes at least one object that should be ignored during counting or measuring, and wherein said processor is configured to ignore said at least one object during counting or measuring.

14. A method for counting objects and measuring volumes comprising calibration mode and a counting or measuring mode, the method comprising:
constructing a background image model;
capturing a measured image that includes at least one object or volume;
if in calibration mode—receiving from a user a value indicating a number of said at least one object or a quantity of said volume;
using said image model and said measured image for determining an area in said measured image indicative of said at least one object or said volume; and
calculating, from said value. and said area, reference application specific parameters; and
if in counting or measuring mode—
using said background image model and said measured image for determining an area in the measured image indicative of said at least one object or said volume; and
calculating, from said area and said reference application specific parameters, an estimated number of said at least one object or an estimated quantity of said volume.

15. The method of claim 14 wherein said background image model undergoes periodic updates.

16. The method of claim 15 wherein the background image model periodic updates occur after capturing each frame.

17. The method of claim 14 wherein said reference application specific parameters include pixel-related data that corresponds to said at least one object or said volume.

18. The method of claim 17 wherein said pixel-related data is a number selected from the group consisting of: number of pixels and ratio between the number of pixels in different dimensions.

19. The method of claim 14 wherein determining an area, indicative of said at least one object or said volume, comprises comparing foreground pixels indicative of said at least one object or said volume in said measured image, and background pixels indicative of said image model.

20. The method of claim 14 wherein said at least one object is a planar object.

21. The method of claim 20 wherein said at least one planar object comprises two or more planar objects and wherein said two or more planar objects are stacked.

22. The method of claim 14 wherein said at least one object has an asymmetrical shape.

23. The method of claim 14 wherein said volume is held within a container.

24. The method of claim 23 wherein said container has an irregular shape.

25. The method of claim 14 wherein said volume is piled on a surface.

26. The method of claim 14 wherein said measured image includes at least one object that should be ignored during counting or measuring, and wherein said calculation is configured to ignore said at least one object during counting or measuring.

27. A universal counting and measuring system for counting objects of various sizes and shapes and measuring volumes comprising:
a camera;
an image processor associated with said camera;
a data storage coupled to said processor, the storage configured to store data indicative of reference application specific parameters obtained by a calibration process;
said camera and image processor configured to:
construct a background image model under first ambient conditions;
capture a measured image that includes at least one object or volume under second ambient conditions;
update either or both of said background image model and said measured image in accordance with either or both of said first ambient conditions and said second ambient conditions, giving rise to an updated background image model and an updated measured image having substantially common conditions;
if in calibration mode—receive from a user a value indicating a number of said at least one object or the quantity of said volume;
use said updated background image model and said updated measured image for determining an area in said measured image indicative of said at least one object or said volume; and
calculate, from said value, and said area, reference application specific parameters; and
if in counting or measuring mode—
use said updated background image model and said updated measured image for determining an area in said measured image indicative of said at least one object or said volume; and
calculate, from said area and said reference application specific parameters, an estimated number of said at least one object or an estimated quantity of said volume.

28. A method for counting objects of various sizes and shapes and measuring volumes, the method comprising a calibration mode and a counting mode, comprising:
constructing a background image model under first ambient conditions;
capturing a measured image that includes at least one object or volume under second ambient conditions;
updating either or both of said background image model and said measured image in accordance with either or both of said first ambient conditions and said second ambient conditions, giving rise to an updated background image model and an updated measured image having substantially common conditions;
if in calibration mode—receiving from a user a value indicating a number of said at least one object or the quantity of said volume;
using said updated background image model and said updated measured image for determining an area in said measured image indicative of said at least one object or said volume; and
calculating, from said value, and said area, reference application specific parameters; and
if in counting or measuring mode—
using said updated background image model and said updated measured image for determining an area in the measured image indicative of said at least one object or said volume; and
calculating, from said area and said reference application specific parameters, an estimated number of said at least one object or an estimated quantity of said volume.

* * * * *